US011398156B2

(12) United States Patent
Wang et al.

(10) Patent No.: US 11,398,156 B2
(45) Date of Patent: Jul. 26, 2022

(54) RAMP MERGING ASSISTANCE

(71) Applicant: Toyota Motor Engineering & Manufacturing North America, Inc., Plano, TX (US)

(72) Inventors: Ziran Wang, Sunnyvale, CA (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 95 days.

(21) Appl. No.: 16/781,211

(22) Filed: Feb. 4, 2020

(65) Prior Publication Data
US 2021/0241623 A1    Aug. 5, 2021

(51) Int. Cl.
| G08G 1/16 | (2006.01) |
| G08G 1/0967 | (2006.01) |
| G08G 1/052 | (2006.01) |
| H04W 4/021 | (2018.01) |

(52) U.S. Cl.
CPC ............. *G08G 1/163* (2013.01); *G08G 1/052* (2013.01); *G08G 1/096716* (2013.01); *G08G 1/166* (2013.01); *G08G 1/167* (2013.01); *H04W 4/021* (2013.01)

(58) Field of Classification Search
CPC .. G08G 1/052; G08G 1/096716; G08G 1/163; G08G 1/166; G08G 1/167; H04W 4/021
See application file for complete search history.

(56) References Cited

U.S. PATENT DOCUMENTS

| 9,738,280 B2 | 8/2017 | Rayes |
| 9,994,221 B2 | 6/2018 | McNew |
| 10,218,771 B2 | 2/2019 | Penilla et al. |
| (Continued) | | |

FOREIGN PATENT DOCUMENTS

| DE | 102014209018 A1 | 11/2014 |
| JP | 6206120 B2 | 10/2017 |
| WO | 2016170635 A1 | 10/2016 |

OTHER PUBLICATIONS

Wang et al., "Cooperative Ramp Merging System: Agent-Based Modeling and Simulation Using Game Engine", SAE International Journal of Connected and Automated Vehicles, vol. 2, Issue 2, 2019 (14 pages).

*Primary Examiner* — Sisay Yacob
(74) *Attorney, Agent, or Firm* — Christopher G. Darrow; Darrow Mustafa PC

(57) ABSTRACT

A server can assist connected vehicles merging from a ramp onto a main lane. A connected vehicle can be configured to communicate with the server. Connected vehicles on the main lane and connected vehicles on the ramp can send their locations and speeds to the server. The server can determine when at least one connected vehicle is within a geo-fence surrounding a merging point, where the main lane and the ramp meet. The server can determine an order in which the connected vehicles on the main lane and on the ramp can merge based on the connected vehicles' locations and speeds. The server can determine an advisory speed for at least one of the connected vehicles based on the order. The server can send the advisory speed to the at least one connected vehicle.

17 Claims, 6 Drawing Sheets

(56) References Cited

U.S. PATENT DOCUMENTS

| | | |
|---|---|---|
| 2012/0109421 A1 | 5/2012 | Scarola |
| 2012/0283942 A1* | 11/2012 | T'Siobbel .............. G01C 21/26 |
| | | 701/410 |
| 2017/0076607 A1* | 3/2017 | Linder ................... B60Q 1/346 |
| 2017/0137025 A1* | 5/2017 | Muto .............. B60W 30/18154 |
| 2017/0369055 A1* | 12/2017 | Saigusa ........... B60W 30/18163 |
| 2019/0001977 A1 | 1/2019 | Lin |
| 2019/0014446 A1 | 1/2019 | Gade |
| 2019/0279502 A1* | 9/2019 | Fowe ................... G08G 1/0112 |
| 2019/0311616 A1 | 10/2019 | Jin |

\* cited by examiner

RAMP MERGING ASSISTANCE

FIELD

The subject matter described herein relates in general to vehicles and, more particularly, to assisting vehicles or vehicle drivers in ramp merging scenarios.

BACKGROUND

Some vehicles are equipped with sensors that can acquire information about the surrounding environment. Such information can be used for various purposes, such as detecting the presence of other vehicles on the road. In some instances, information acquired by the sensors can be used by a human driver in deciding how to navigate and/or maneuver the vehicle through the surrounding environment.

SUMMARY

In one respect, the subject matter presented herein relates to a ramp merging assistance method. The method can include determining, by one or more servers, an order for a plurality of connected vehicles to merge on a main lane substantially at a merging point. A merging point is where the main lane and a ramp meet. One or more of the plurality of connected vehicles can be located on the ramp, and one or more of the plurality of connected vehicles can be located on the main lane approaching the merging point. The method can include determining, by the one or more servers, an advisory speed for at least one of the connected vehicles such that the plurality of connected vehicles achieve the order. The method can include sending, by the one or more servers, the advisory speed to the at least one connected vehicle.

In another respect, the subject matter presented herein relates to a ramp merging assistance system. The system can include one or more servers communicatively connected to a plurality of connected vehicles. The one or more servers can be configured to determine an order for the plurality of connected vehicles to merge on a main lane substantially at a merging point. The merging point being where the main lane and a ramp meet. One or more of the plurality of connected vehicles can be located on the ramp, and one or more of the plurality of connected vehicles can be located on the main lane approaching the merging point. The one or more servers can be configured to determine an advisory speed for at least one of the connected vehicles such that the plurality of connected vehicles achieve the order. The one or more servers can be configured to send the advisory speed to the at least one connected vehicle.

In still another respect, the subject matter described herein relates to a ramp merging assistance computer program product. The computer program product can include a non-transitory computer readable storage medium having program code embodied therein. The program code executable by a processor to perform a method. The method can include determining, by a server, an order for a plurality of connected vehicles to merge on a main lane substantially at a merging point. The merging point being where the main lane and a ramp meet. One or more of the plurality of connected vehicles can be located on the ramp, and one or more of the plurality of connected vehicles can be located on the main lane approaching the merging point. The method can include determining, by the server, an advisory speed for at least one of the connected vehicles such that the plurality of connected vehicles achieve the order. The method can include sending, by the server, the advisory speed to the at least one connected vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
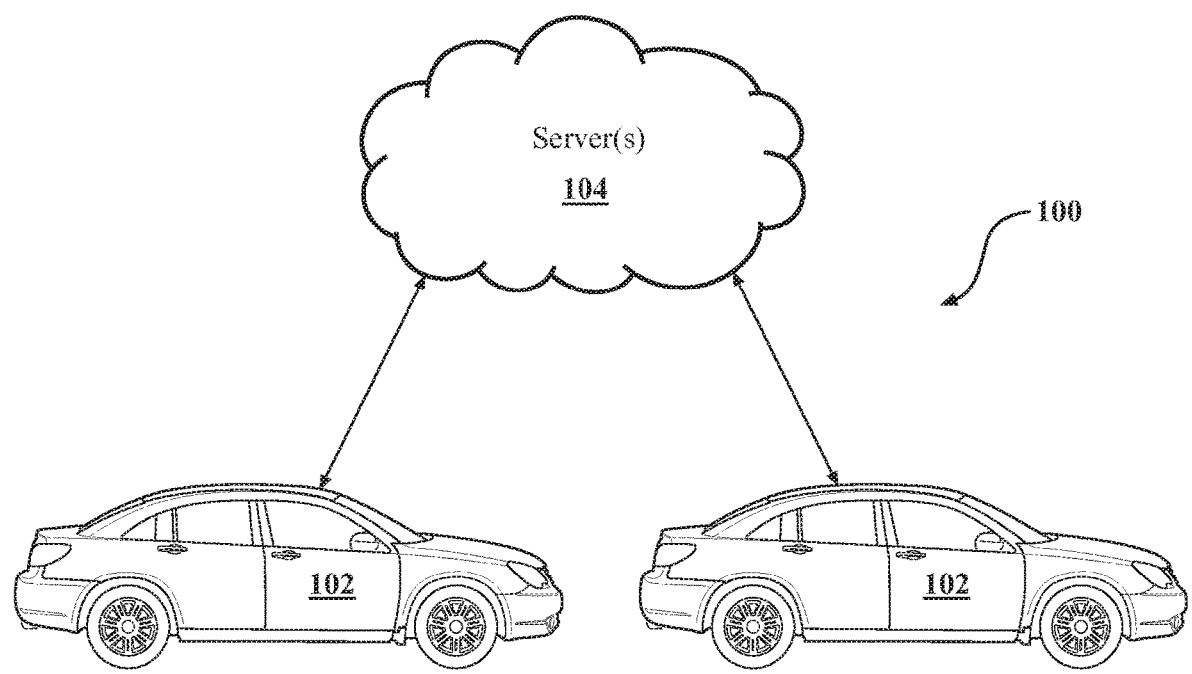
FIG. 1 is an example of a portable ramp merging assistance system.

A human driver can make driving decisions based on the driver's observations of the environment and in some cases, with the assistance from vehicle-based technologies (e.g., blind-spot detection) using vehicle-based sensors. However, while the driver's observation of the environment and the vehicle sensors are limited to an observable/detection range, the driving decisions can be affected by events occurring beyond the observable range of the driver and the vehicle sensors. For instance, a driver travelling on a ramp towards a main lane may have an obstructed view of the main lane and may be unable to observe vehicles travelling on the main lane. In such instances, the driver may be unable to determine the speed to be attained to seamlessly merge into the main lane. In other instances, vehicles travelling on the main lane may travel at speeds that make it difficult for a driver travelling on a ramp to merge. Further, vehicles travelling on the main lane may not maintain gaps large enough for a driver to merge.

Arrangements presented herein are directed to a ramp merging assistance. The ramp merging assistance can include a portable device that can be installed in or removed from a connected vehicle with little to no impact on the underlying hardware of the connected vehicle. As such the ramp merging assistance capabilities can be moved from one vehicle to another. A connected vehicle is a vehicle that is communicatively linked to a server. A non-connected vehicle is a vehicle that is not communicatively linked to the server.

The ramp merging assistance can include one or more servers that can identify connected vehicles travelling toward a merging point between a main lane and a ramp. In some arrangements, the ramp can be a lane that connects to the main lane at the merging point but is otherwise not adjacent to the main lane (e.g., a highway entrance ramp). In some arrangements, the ramp can be a lane that is adjacent to the main lane but is coming to an end (e.g., when there is a reduction in the number of lanes on a road, narrowing of the road for road maintenance/construction, etc.). The server(s) can determine an order for the connected vehicles to merge onto the main lane in a cooperative manner. As an example, the server(s) can receive the location and speed of the connected vehicles. In some arrangements, the server(s) can determine when the connected vehicles are within a geo-fence surrounding the merging point. The geo-fence can include a portion of the main lane and the ramp upstream of the merging point relative to the travel direction of the main lane and the ramp. In some arrangements, the geo-fence can include a portion of the main lane downstream of the merging point relative to the travel direction of the main lane.

Upon determining that the connected vehicles are within the geo-fence and approaching the merging point, the server(s) can determine which connected vehicles are on the main lane and which connected vehicles are on the ramp. The server(s) can determine the arrival time to the merging point for the connected vehicles. The arrival time refers to the time it would take for the connected vehicle to arrive at the merging point. Based on the arrival times of the connected vehicles, the server(s) can determine the order for the connected vehicles to merge. Based on the order, the server(s) can send an advisory speed to the connected vehicles.

The advisory speed can be a speed that the connected vehicle can travel at to ensure a successful and cooperative merging. Cooperative merging can refer to the connected vehicles approaching the merging point and adjusting their speeds to the advisory speed to allow the connected vehicles on the ramp to merge onto the main lane. Cooperative merging can also refer to the connected vehicles approaching the merging point without significantly affecting traffic flow of the main lane and/or without requiring the vehicles in the main lane to change lanes. The advisory speed can be a single value or a range. The advisory speed can be vehicle specific as the arrival times for the connected vehicles can also be vehicle specific. The server does not send advisory speeds to non-connected vehicles or to connected vehicles that are not approaching the merging point or to connected vehicles that would not otherwise be involved in merging activity.

Arrangements described herein can monitor the connected vehicles. The server(s) can monitor the speed at which the connected vehicles are travelling to determine whether the connected vehicles are striving toward or maintaining the advisory speed. In the case that a connected vehicle is not striving toward or maintaining the advisory speed, the server(s) can send an alert to the connected vehicle. The alert can prompt the driver to attain the advisory speed. Alternatively or additionally, the server(s) can deactivate the ramp merging assistance.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a ramp merging assistance (RMA) system 100 is shown. The RMA system 100 can include various elements, which can be communicatively linked in any suitable form. As an example, the elements can be connected as shown in FIG. 1. Some of the possible elements of the RMA system 100 are shown in FIG. 1 and will now be described. It will be understood that it is not necessary for the RMA system 100 to have all of the elements shown in FIG. 1 or described herein. The RMA system 100 can have any combination of the various elements shown in FIG. 1. Further, the RMA system 100 can have additional elements to those shown in FIG. 1. In some arrangements, the RMA system 100 may not include one or more of the elements shown in FIG. 1. Further, it will be understood that one or more of these elements can be physically separated by large distances.

The elements of the RMA system 100 can be communicatively linked through one or more communication networks. As used herein, the term "communicatively linked" can include direct or indirect connections through a communication channel or pathway or another component or system. A "communication network" means one or more components designed to transmit and/or receive information from one source to another. The one or more of the elements of the RMA system 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The RMA system 100 can include one or more servers 104. The server(s) 104 can be cloud-based server(s). The server(s) 104 can communicate with one or more connected vehicles 102 over a communication module, such as by any type of vehicle-to-cloud (V2C) communications, now known or later developed. The server(s) 104 can receive vehicle location data and/or current speed data from the connected vehicle(s) 102, determine an order in which the connected vehicles 102 should merge and at what speed, and send the determined speed (also known as an advisory speed) to the connected vehicles 102.

The RMA system 100 can include one or more connected vehicles 102. As used herein, "vehicle" means any form of motorized transport. In one or more implementations, the vehicle can be an automobile. While arrangements will be described herein with respect to automobiles, it will be understood that embodiments are not limited to automobiles.

In some implementations, the vehicle can be any other type of vehicle that may be used on a roadway, such as a motorcycle. In some implementation, the vehicle can be a watercraft, an aircraft or any other form of motorized transport. The connected vehicle 102 can be a vehicle that is communicatively linked to one or more elements of the RMA system 100 (e.g., server(s) 104). As such, a non-connected vehicle can be a vehicle that is not communicatively linked to one or more elements of the RMA system 100 (e.g., server(s) 104).

In one or more arrangements, the connected vehicle(s) 102 can have a manual operational mode in which all of or a majority of the navigation and/or maneuvering of the connected vehicle(s) 102 is performed by a human driver. In one or more arrangements, the connected vehicle(s) 102 can be a conventional vehicle that is configured to operate in only a manual mode. In one or more arrangements, the connected vehicle(s) 102 can be driven by human drivers without any level of automated control.

The connected vehicle(s) 102 can determine their location, using as an example, a global positioning system (GPS) or a geolocation system. The connected vehicle(s) 102 can determine their current speed, such as by one or more speedometers. The connected vehicle(s) 102 can send the vehicle location and/or speed to the server(s) 104 via a communication module such as a Wi-Fi network. Additionally, the connected vehicle(s) 102 can receive information from the server(s) 104. As an example, the connected vehicle(s) 102 can receive the advisory speed from the server(s) 104. The sending and/or receiving can occur on any suitable basis (e.g., continuously, periodically, irregularly, in response to a command or input, randomly, etc.).

The various elements of the RMA system 100 will be discussed in turn below in connections with FIGS. 2-6. It will be understood that it is not necessary for these elements to have all of the sub-elements shown in FIGS. 2-6 or described herein. Further, there can be additional sub-elements to those shown in FIGS. 2-6. Further, while the various sub-elements may be shown as being located on or within the associate element in FIGS. 2-6, it will be understood that one or more of these sub-elements can be located external to the associated element or even remote from the associated element.

Figure 2:
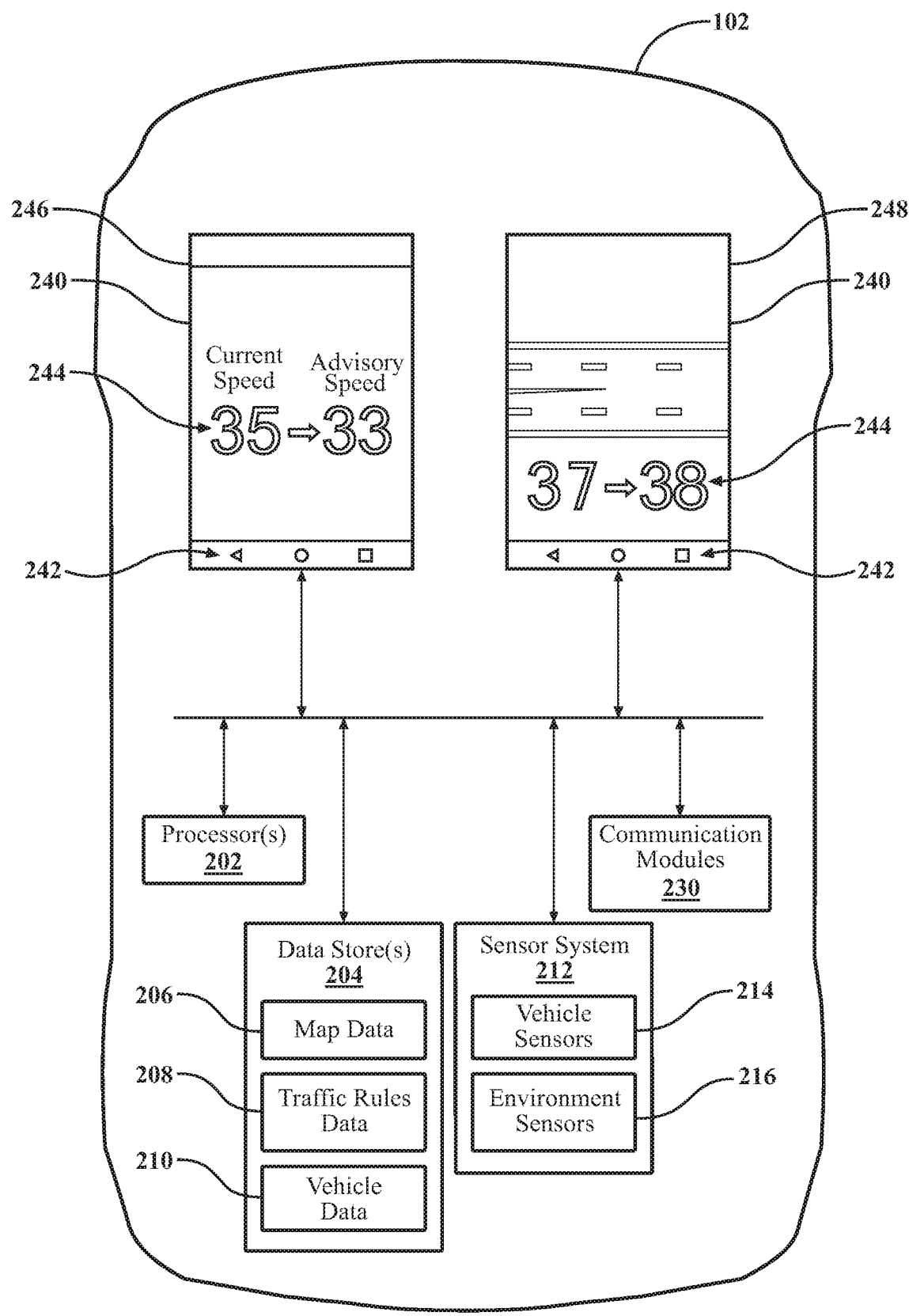
FIG. 2 is an example of a connected vehicle.

Referring to FIG. 2, an example of a connected vehicle 102 is shown. The connected vehicle 102 can include one or more processors 202. "Processor" means any component or group of components that are configured to execute any of the processes described herein or any form of instructions to carry out such processes or cause such processes to be performed. The processor(s) 202 can be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 202 can include at least one hardware circuit (e.g., an integrated circuit) configured to carry out instructions contained in program code. In arrangements in which there is a plurality of processors 202, such processors can work independently from each other or one or more processors 202 can work in combination with each other. In one or more arrangements, one or more processors 202 can be a main processor(s) of the vehicle. For instance, one or more processors 202 can be electronic control unit(s) (ECU).

The connected vehicle 102 can include one or more data stores 204 for storing one or more types of data. The data store(s) 204 can include volatile and/or non-volatile memory. Examples of suitable data stores 204 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 204 can be a component of the processor(s) 202, or the data store(s) 204 can be operatively connected to the processor(s) 202 for use thereby. The term "operatively connected," as used throughout this description, can include direct or indirect connections, including connections without direct physical contact.

In one or more arrangements, the data store(s) 204 can include map data 206. The map data 206 can include maps of one or more geographic areas. In some instances, the map data 206 can include information or data on roads, traffic control devices, road markings, street lights, structures, features, and/or landmarks in the one or more geographic areas. The map data 206 can include information about ramps, merging points between the ramps and the main lanes, and geo-fences surrounding the merging points. The map data 206 can be in any suitable form. In some instances, the map data 206 can include aerial views of an area. In some instances, the map data 206 can include ground views of an area, including 360 degree ground views. The map data 206 can include measurements, dimensions, distances, positions, coordinates, and/or information for one or more items included in the map data 206 and/or relative to other items included in the map data 206. The map data 206 can include a digital map with information about road geometry. In one or more arrangement, the map data 206 can include information about the ground, terrain, roads, surfaces, and/or other features of one or more geographic areas. The map data 206 can include elevation data in the one or more geographic areas. The map data 206 can define one or more ground surfaces, which can include paved roads, unpaved roads, land, and other things that define a ground surface. The map data 206 can be high quality and/or highly detailed.

In one or more arrangements, the data store(s) 204 can include traffic rules data 208. As used herein, "traffic rule" is any law, rule, ordinance or authority that governs the operation of a motor vehicle, including motor vehicles in motion and motor vehicles that are parked or otherwise not in motion. The traffic rules data 208 can include data on instances, situations, and/or scenarios in which a motor vehicle is required to stop or reduce speed. The traffic rules data 208 can include speed limit data. The traffic rules data 208 can include international, federal, national, state, city, township and/or local laws, rules, ordinances and/or authorities. The traffic rules data 208 can include data on traffic signals and traffic signs.

In one or more arrangements, the data store(s) 204 can include vehicle data 210. The vehicle data 210 can include information or data about the connected vehicle 102. For instance, the vehicle data 210 can include vehicle type, model, year of manufacture, vehicle history, and special features.

The connected vehicle 102 can include a sensor system 212. The sensor system 212 can include one or more sensors. "Sensor" means any device, component and/or system that can detect, determine, assess, monitor, measure, quantify, acquire, and/or sense something. The sensor(s) can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables a processor to keep up with some external process.

The sensor system 212 can include one or more vehicle sensors 214. The vehicle sensor(s) 214 can detect, determine, assess, monitor, measure, quantify and/or sense information about the connected vehicle 102 itself. For instance, the vehicle sensors 214 can include a GPS sensor that detects the location, orientation, speed, acceleration, and/or deceleration of the connected vehicle(s) 102. Alternatively or in addition, the sensor system 212 can include one or more environment sensors 216 configured to detect, determine, assess, monitor, measure, quantify, acquire, and/or sense driving environment data. "Driving environment data" includes and data or information about the external environment in which the connected vehicle 102 is located or one or more portions thereof. In one or more arrangements, the environment sensors can include one or more radar sensors, one or more LIDAR sensors, one or more sonar sensors, one or more cameras, and/or one or more ranging sensors.

The connected vehicle 102 can include one or more communication modules 230. A "communication module" refers to a component designed to transmit and/or receive information from one source to another. The communication module(s) 230 can transmit and/or receive information via one or more communication networks. The communication network(s) can include an internal vehicle communication network as well as an external communication network.

The internal vehicle communication network can include a bus in the connected vehicle(s) 102 such as a controller area network (CAN) or the like, and/or other wired and/or wireless mechanisms. The elements of the connected vehicle 102 such as the data store 204, the sensor system 212, and the processor 202 can be communicatively linked to each other through the internal vehicle communication network. Each of the elements of the connected vehicle 102 can include and/or execute suitable communication software, which enables the various elements to communicate with each other through the communication network and perform the functions disclosed herein.

The external communication network represents one or more mechanisms by which the connected vehicle 102 can communicate with other elements in the RMA system 100, e.g., the server(s) 104. For instance, the connected vehicle 102 can send information about the connected vehicle 102 to the server(s) 104. The information can include the location, orientation, speed, vehicle model/type. The connected vehicle 102 can receive information such as advisory speed and alerts from the server(s) 104. The external communication network can include any suitable communication mechanism such as a Wi-Fi hotspot.

The connected vehicle 102 can include one or more user interfaces 240. The user interface(s) 240 can be operatively connected to the communications modules(s) 230 and/or other elements of the connected vehicle 102. The user interface(s) 240 can include one or more input interfaces 242. An "input interface" includes any device, component, system, element or arrangement or groups thereof that enable information/data to be entered into a machine. The input interface(s) 242 can receive an input from a user (e.g., a person) or other entity. Any suitable input interface(s) 242 can be used, including, for example, a keypad, display, touch screen, multi-touch screen, button, joystick, mouse, trackball, microphone, gesture recognition (radar, LiDAR, camera, or ultrasound-based), and/or combinations thereof.

The user interface(s) 240 can include one or more output interfaces 244. An "output interface" includes any device, component, system, element or arrangement or groups thereof that enable information/data to be presented to a user (e.g., a person) or other entity. The output interface(s) 244 can present information/data to a user or other entity. The output interface(s) 244 can include a display, an earphone, haptic device, and/or speaker.

As an example and as shown in FIG. 2, the connected vehicle(s) 102 can include a driver user interface 246. The driver user interface 246 can display any suitable information for a vehicle driver, including, for example, the connected vehicle's current speed, the advisory speed, and/or an alert. Additionally, the connected vehicle 102 can include a passenger user interface 248. The passenger user interface 248 can display any suitable information including the connected vehicle's current speed, the advisory speed, an alert, a satellite view of the connected vehicle's location, and/or a satellite view of an upcoming ramp. The passenger user interface 248 can display information about other vehicles (received from the server(s) 104), such as the other vehicles' speed, to one or more passengers. Based on the displayed information, the passengers can determine whether vehicles approaching the ramp are participating in cooperative merging. The user interface 240, 246, 248 can include any suitable mobile or portable device (e.g., a smart phone, a tablet computer, etc.).

Figure 3:
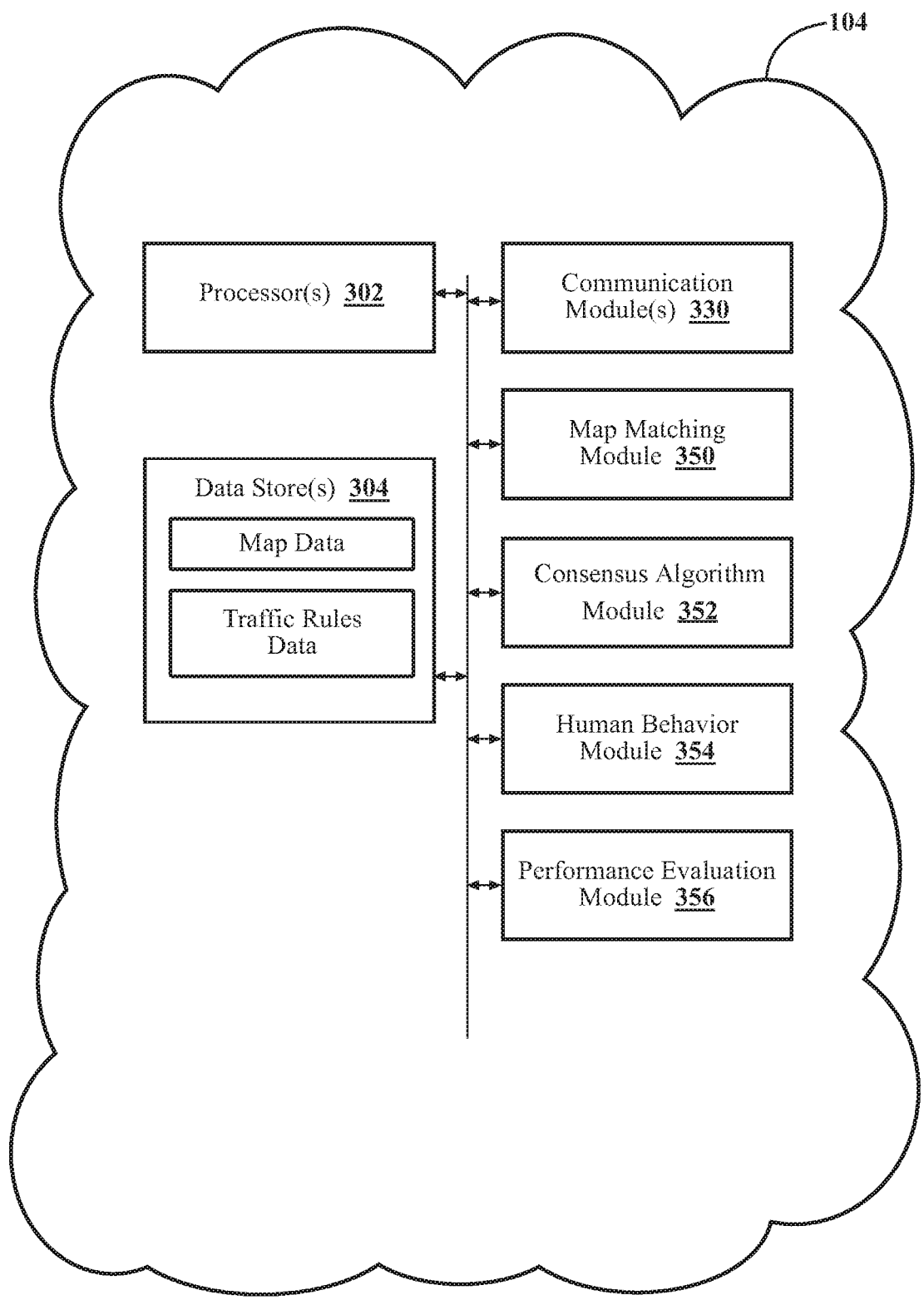
FIG. 3 is an example of a server.

Referring to FIG. 3, an example of a server 104 is shown. The server 104 can include one or more processors 302, one or more data stores 304, and one or more communication modules 330. The above description of the processors 202, the data stores 204, and the communication modules 230 apply equally to the processors 302, the data stores 304, and the communications modules 330, respectively, and will not be described further to avoid redundancy.

The server 104 can include one or more modules, at least some of which will be described herein. The modules can be implemented as computer readable program code that, when executed by a processor, implement one or more of the various processes described herein. One or more of the modules can be a component of the processor(s) 302, or one or more of the modules can be executed on and/or distributed among other processing systems to which the processor(s) 302 is operatively connected. The modules can include instructions (e.g., program logic) executable by one or more processor(s) 302. Alternatively or in addition, one or more data stores 304 can contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In one or more arrangements, the server 104 can include a map matching module 350, a consensus algorithm module 352, a human behavior module 354, and/or a performance evaluation module 356.

The map matching module 350 can be configured to determine whether the connected vehicle(s) 102 are within a geo-fence surrounding a merging point. The geo-fence can be an imaginary boundary surrounding the merging point. The geo-fence can be predetermined area, or it can be determined in real-time based on current conditions. The geo-fence can have any suitable shape. For example, the geo-fence can be substantially rectangular.

The map matching module 350 can be configured to map at least one or more connected vehicles 102 onto a map of an upcoming ramp and a portion of the surrounding roads. The map matching module 350 can receive data from the GPS sensor and/or other sensors of the at least one or more connected vehicles 102, indicating a location (e.g., a longitude value and a latitude value for the connected vehicle 102) and/or a speed of the connected vehicle(s) 102. Based on the received data, the map matching module 350 can retrieve a map of an area surrounding the connected vehicle 102 from the data store(s) 304. The map matching module 350 can identify whether the connected vehicle 102 is approaching a ramp and is within a geo-fence surrounding the ramp using, as an example, a combination of map data, vehicle location, and image recognition techniques. The map matching module 350 can determine the position of the connected vehicle(s) 102 relative to the upcoming ramp, the portion of the surrounding roads, and/or other vehicles, based on the location and speed of the connected vehicle(s) 102.

Upon determining that at least one connected vehicle 102 is within the geo-fence surrounding the merging point, the map matching module 350 can filter the connected vehicle(s) 102 that are not located within the geo-fence and/or any vehicles that are irrelevant to merging (e.g., vehicles that have passed the merging point, vehicles that at located too far away laterally and/or longitudinally from the merging point, etc.). The map matching module 350 can be configured to distinguish connected vehicle(s) 102 travelling on the ramp toward the main lane from the connected vehicle(s) 102 already travelling on the main lane. The map matching module 350 can filter the connected vehicle(s) 102 based on the position of the connected vehicle(s) 102 relative to the ramp and/or a merging point on the map. The map matching module 350 can identify a merging point, i.e., the point, location, area, region, plane, or zone where the ramp meets the main lane, using as an example, information in the data store 304 and/or image recognition techniques. The map matching module 350 can calculate a distance from the position of the connected vehicles (on the ramp or on the main lane) to the merging point. The connected vehicle(s) 102 on the ramp can begin to transition to the main lane substantially at the merging point. In this respect, "substantially at" includes at, slightly before (up to 5, 10, 15, 20, or 30 meters before), or slightly after (e.g., up to 5, 10, 15, 20 or 30 meters after) the merging point.

The consensus algorithm module 352 can identify whether to determine a raw advisory speed for the connected vehicle(s) 102 approaching the merging point based on the number of connected vehicles 102 approaching the merging point, the distance between the connected vehicles and the merging point, the time required to arrive at the merging point, the speed of the connected vehicles 102, other factors, or any combination thereof. The raw advisory speed refers to a speed that if attained and maintained by the connected vehicle(s) 102 would ensure a successful merging. As an example, if the map matching module 350 identifies one connected vehicle 102 approaching the merging point and no connected vehicles 102 on the main lane, the consensus algorithm module 352 can determine that a raw advisory speed is not required. As another example, if the map matching module 350 identifies two connected vehicles 102, one on the ramp and one on the main lane, both arriving at the merging point in 10 seconds, the consensus algorithm module 352 can determine that a raw advisory speed can be calculated for at least one of the connected vehicles 102.

The consensus algorithm module 352 can determine the raw advisory speed for the connected vehicle(s) 102 based on at least the number of connected vehicles approaching the merging point, the distance between the connected vehicle(s) 102 and the merging point, the time required to arrive at the merging point, and/or the speed of the connected vehicle(s) 102. The consensus algorithm module 352 can receive the distance and the speed of the connected vehicle(s) 102 from the map matching module 350 or from the connected vehicle(s) 102. The consensus algorithm module 352 can determine the time required. The consensus algorithm module 352 can use any suitable techniques, now known or later developed, to determine the raw advisory speed for the connected vehicles approaching the ramp.

The consensus algorithm module 352 can further determine the raw advisory speed such that, upon merging, speed consensus and/or position consensus are attained. Speed consensus refers to the connected vehicles 102 maintaining substantially the same longitudinal speed, and position consensus refers to the connected vehicles 102 substantially maintaining a predetermined distance from each other. In one or more instances, the consensus algorithm module 352 can receive a position and a speed for a first connected vehicle 102 preceding a second connected vehicle 102 from the map matching module 350. Based on the position and speed of the first connected vehicle 102, the consensus algorithm module 352 can determine the raw advisory speed for the second connected vehicle 102 so as to attain speed consensus and position consensus. The consensus algorithm module 352 can determine the predetermined distance between the first connected vehicle 102 and the second connected vehicle 102 based on the speed of the first connected vehicle 102. The distance can be directly proportional to the speed of the connected vehicles. In other words, the higher the speed of the connected vehicles 102, the larger the distance between the first connected vehicle 102 and the second connected vehicle 102. Likewise, the lower the speed of the connected vehicles 102, the smaller the distance between the first connected vehicle 102 and the second connected vehicle 102. The distance can be based on the minimum distance within which the driver of the connected vehicles can react and brake without rear-ending another vehicle. The raw advisory speed can be based on the predetermined distance, the speed of a preceding connected vehicle 102 and the speed within which the driver of the connected vehicle(s) 102 can react and brake without rear-ending a preceding connected vehicle 102. In some instances, the raw advisory speed can be the advisory speed.

The human behavior module 354 can be configured to determine the advisory speed based on the raw advisory speed and a driver tracking error. The driver of the connected vehicle 102 may not be capable of attaining the raw advisory speed. As such, the human behavior module 354 can determine a margin of error between a speed suggested to the driver and the speed the driver actually attains/maintains. The human behavior module 354 can determine the margin of error, also known as the driver tracking error, by training a neural network in the human behavior module 354 with historical driver tracking error data. Based on the training and the determined driver tracking error, the human behavior module 354 can predict the driver tracking error for an upcoming time step and can adjust the advisory speed to compensate for the predicted driver tracking error. The human behavior module 354 can send the advisory speed to the connected vehicle(s) 102 via the communications module 330 using, as an example, V2C communications.

The performance evaluation module 356 can be configured to send an alert to the connected vehicle(s) 102, informing the connected vehicle(s) 102 of an impact of the connected vehicle's driving style. For instance, the performance evaluation module 356 can determine that the driver of one or more of the connected vehicle(s) 102 is driving aggressively and may not successfully merge. In such an instance, the performance evaluation module 356 can send an alert to the connected vehicle(s) 102, informing the connected vehicle(s) 102 that the connected vehicle 102 is driving aggressively which may affect its ability to successfully merge. Additionally, the performance evaluation module 356 can deactivate or send a signal to deactivate the merging assistance process.

The performance evaluation module 356 can receive data such as vehicle speed and vehicle type/model from the connected vehicle(s) 102 via the communications module 330 using, as an example, V2C communications. The performance evaluation module 356 can perform real-time analysis of the data received from the connected vehicle(s) 102 such as dynamics of the connected vehicle(s) 102 (e.g., speed, acceleration, and/or jerk), style of driving (e.g., aggressive driving, speeding, slow driving), energy consumption, pollutant emissions, etc. Using the real-time analysis, the performance evaluation module 356 can determine how responsive the connected vehicle(s) 102 is to the instructions, e.g., the advisory speed, from the server 104. The performance evaluation module 356 can determine the impact of the connected vehicle's response to instructions and can send alert to the connected vehicle 102. The real-time analysis and determination can be carried out using any suitable techniques such as machine learning. Additionally, the performance evaluation module 356 can send alert to the connected vehicle(s) 102, detailing any relevant information such as the connected vehicle's energy consumption, pollutant emissions.

The server 104 can receive data from and/or send data to the connected vehicle(s) 102 continuously, periodically, upon request from the server 104, randomly, or in any other suitable manner. Similarly, the connected vehicle(s) 102 can receive data from and/or send data to one or more servers 104 continuously, periodically, upon request from the connected vehicle(s) 102, randomly, or in any other suitable manner.

Now that the various potential systems, devices, elements and/or components of the 100 have been described, various methods will now be described. Various possible steps of such methods will now be described. The methods described may be applicable to the arrangements described above in relation to FIGS. 1-3, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 4:
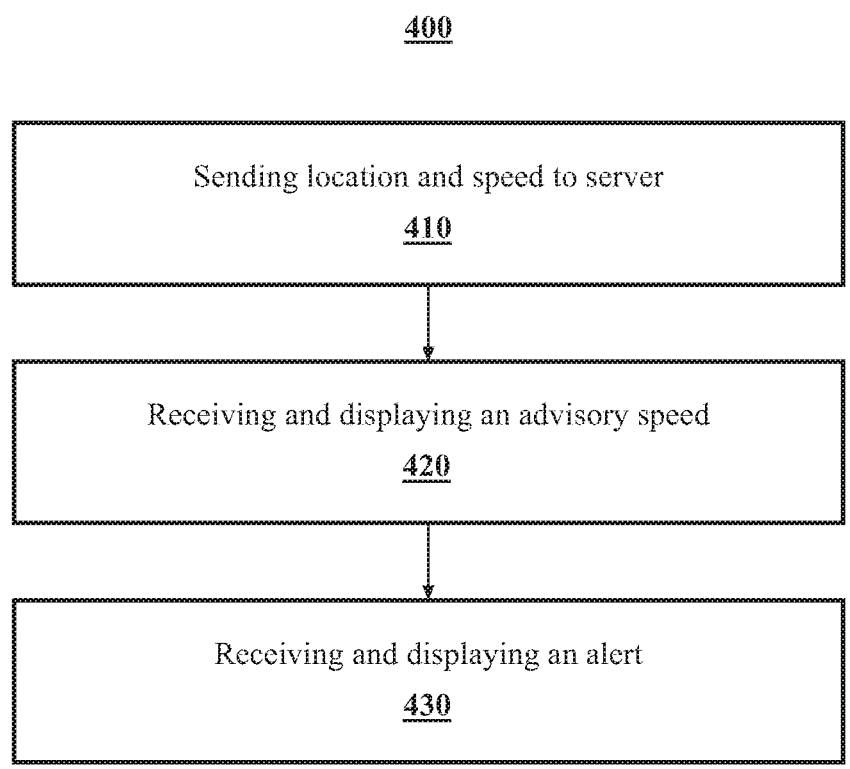
FIG. 4 is an example of a vehicle-based method.

Referring now to FIG. 4, an example of a vehicle-based method 400 is shown. The method 400 can be directed to actions being performed by one or more of the connected vehicles 102 of the RMA system 100.

At block 410, data such as a connected vehicle's location, speed, and/or type can be sent to the server(s) 104. The connected vehicle(s) 102 can acquire the connected vehicle's location and speed using vehicle sensors, such as a GPS sensor and/or a speedometer. The connected vehicle(s) 102 can retrieve the vehicle type from the vehicle data 210 in the data store 204. The connected vehicle(s) 102 can transmit the data to the server 104 via the communication network. The method 400 can continue to block 420.

At block 420, an advisory speed can be received and displayed in the connected vehicle(s) 102. More specifically and as previously mentioned, a driver user interface 246 can display information including the advisory speed received from the server 104 and the connected vehicle's current speed. Additionally, in some arrangements, a passenger user interface 248 can display information including the advisory speed, the connected vehicle's current speed, a satellite view of the connected vehicle's location. The driver of the connected vehicle 102 can decide whether to change the operation of the connected vehicle 102 based on the advisory speed. The method 400 can continue to block 430.

At block 430, an alert can be received and displayed in the connected vehicle(s) 102, informing the connected vehicle(s) 102 of an impact of the connected vehicle's driving style. More specifically and as previously mentioned, the driver user interface 246 can display the alert received from the server 104. The driver of the connected vehicle 102 can decide whether to change the operation of the connected vehicle 102 based on the alert. The method 400 can end. Alternatively, the method 400 can return to block 410 or some other block.

Figure 5:
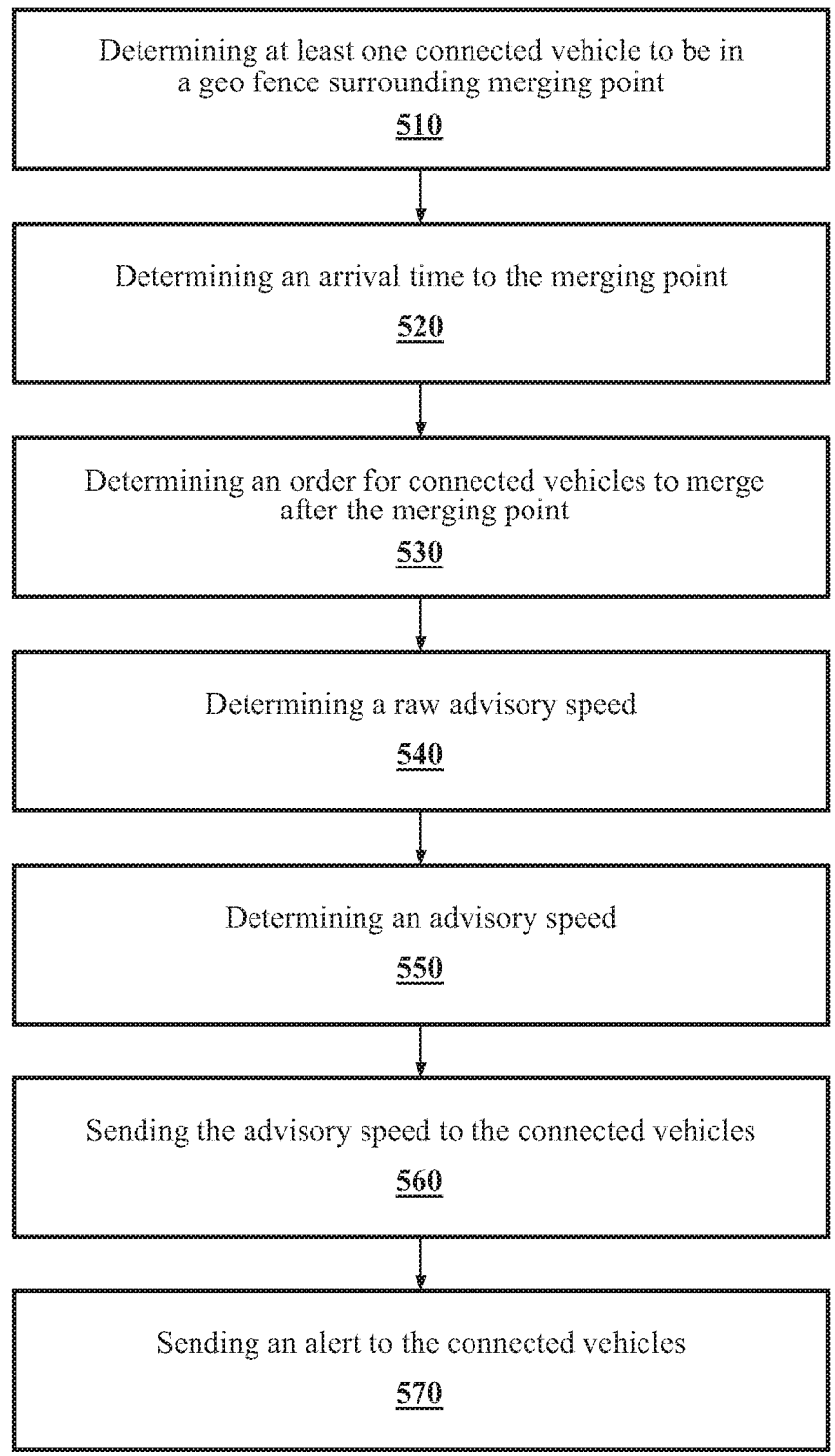
FIG. 5 is an example of a server-based method.

Referring now to FIG. 5, an example of a server-based method 500 is shown. The method 500 can be directed to actions being performed by one or more of the servers 104 of the RMA system 100.

At block 510, at least one connected vehicle 102 can be determined to be within a geo-fence surrounding a merging point. More specifically and as previously mentioned, the server 104 and the map matching module 350 can determine whether the connected vehicle(s) 102 are within the geo-fence surrounding the merging point. Data such as vehicle location and speed can be acquired by a server 104 from the connected vehicle(s) 102. The method 500 can continue to block 520.

At block 520, the arrival time to the merging point for the connected vehicle(s) 102 can be determined. More specifically and as previously mentioned, the server 104 or the map matching module 350 can determine the arrival time to the merging point based on the location of the connected vehicle(s) 102 relative to the merging point and the speed of the connected vehicle(s) 102. The method 500 can continue to block 530.

At block 530, an order in which the connected vehicle(s) 102 can merge onto the main lane after the merging point can be determined. More specifically and as previously mentioned, the server 104 or the consensus algorithm module 352 can determine an order in which the connected vehicle(s) 102 can merge in a cooperative manner. The method 500 can continue to block 540.

At block 540, a raw advisory speed can be determined for at least one of the connected vehicle(s) 102 by the server 104. More specifically and as previously mentioned, the consensus algorithm module 352 can determine the raw advisory speed based on the determined order of merging. The method 500 can continue to block 550.

At block 550, an advisory speed can be determined for at least one of the connected vehicle(s) 102 such that the connected vehicle(s) 102 can achieve the determined order of merging. More specifically and as previously mentioned, the human behavior module 354 can determine the advisory speed based on the raw advisory speed and the driver tracking error. The method 500 can continue to block 560.

At block 560, an advisory speed can be sent to at least one of the connected vehicle(s) 102 by the server(s) 104. More specifically and as previously mentioned, the human behavior module 354 can send the advisory speed to at least one of the connected vehicle(s) 102. The method 500 can continue to block 570.

At block 570, an alert can be sent to the connected vehicle(s) 102. As previously mentioned, the server 104 and the performance evaluation module 356 can monitor the connected vehicle(s) 102. The server 104 can monitor the connected vehicle(s) 102 to determine whether the advisory speed has been attained. In the case where one or more connected vehicle(s) 102 have not been attained the advisory speed, the server 104 can send the alert to the one or more connected vehicle(s) 102. Additionally or alternatively, the server 104 can deactivate the merging assistance process. Further, the alert can inform the connected vehicle(s) 102 of an impact of the connected vehicle's driving style. The method 500 can end. Alternatively, the method 500 can return to block 510 or some other block.

Figure 6A:
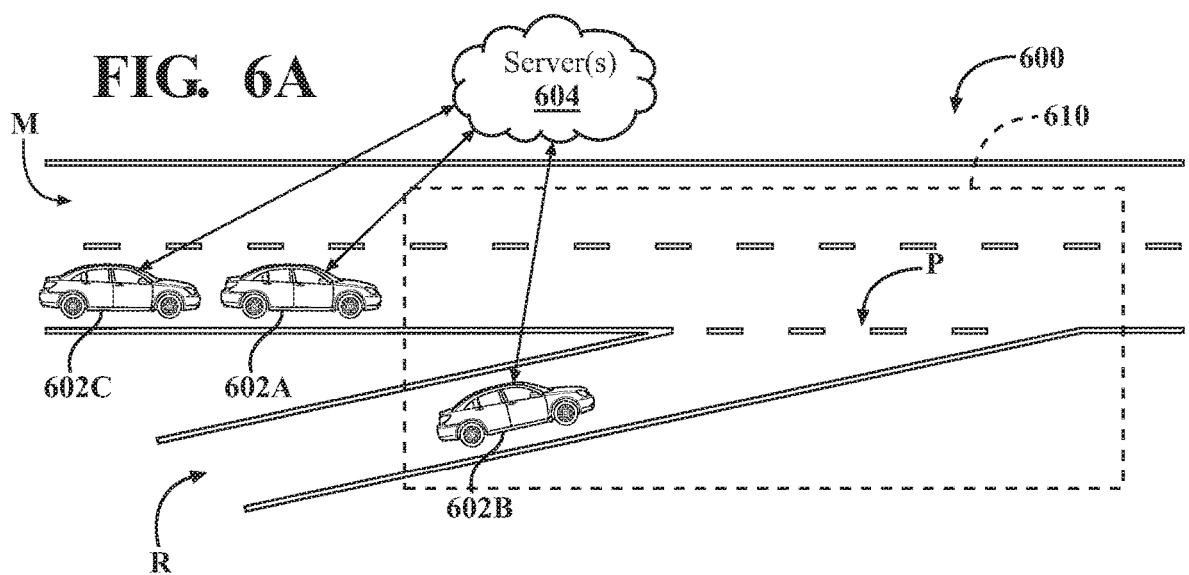
FIGS. 6A-6C are an example of a ramp merging scenario.
Figure 6B:
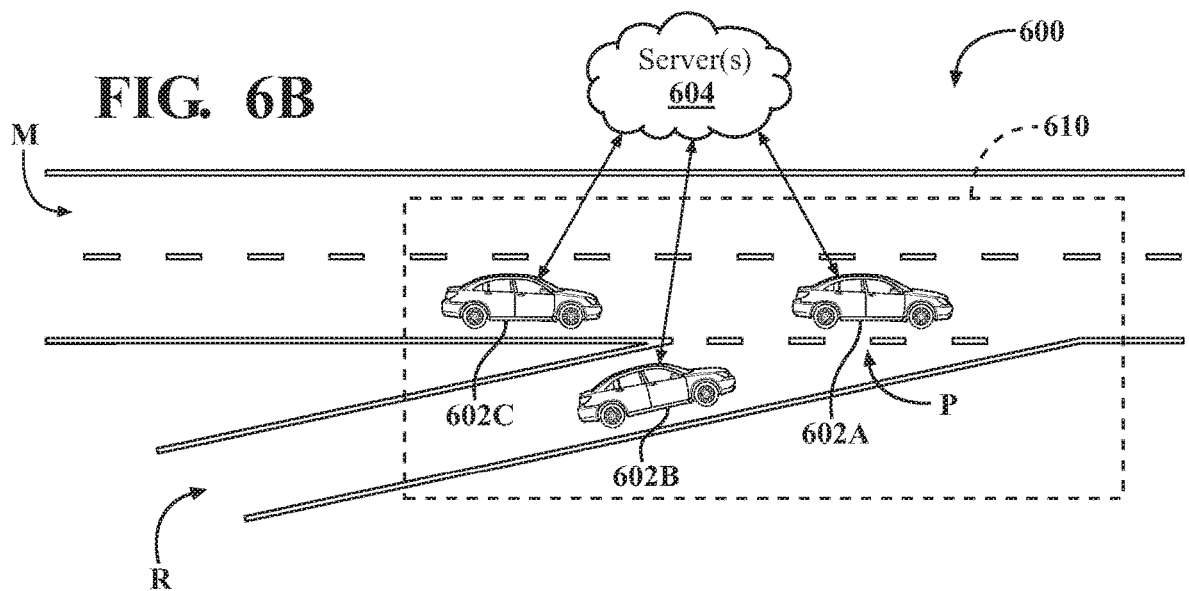
Figure 6C:
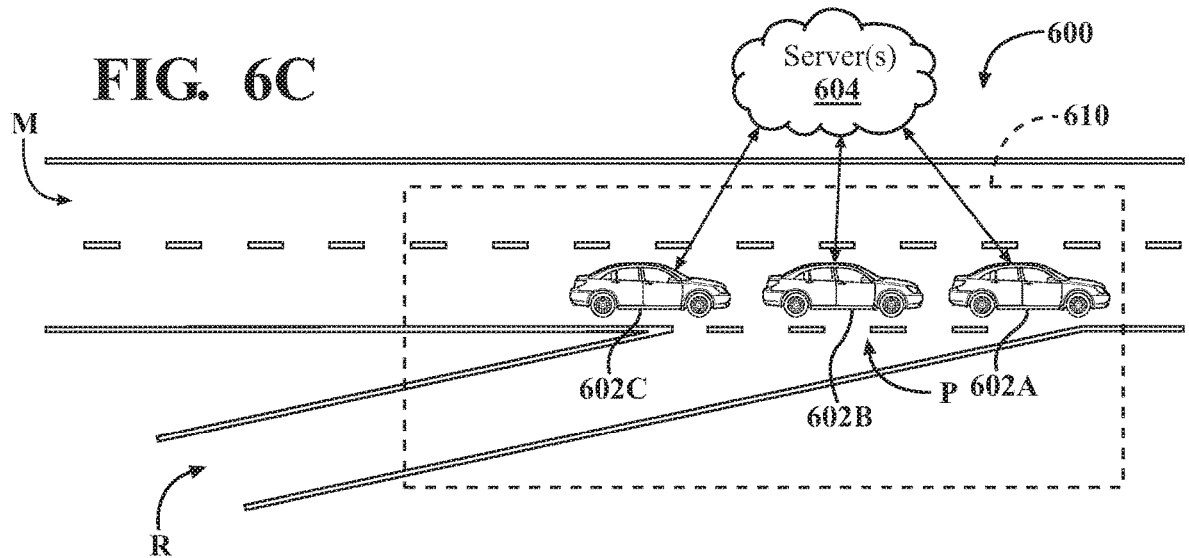

A non-limiting example of the operation of the RMA system 100 and/or one or more of the methods will now be described in relation to FIGS. 6A-6C. FIGS. 6A-6C show an example of a ramp merging scenario. Referring to FIGS. 6A-6C, a first connected vehicle 602A, a second connected vehicle 602B, and a third connected vehicle 602C can be traveling in an environment 600. The connected vehicles 602A, 602B, 602C can be communicatively coupled to one or more servers 604.

As shown in FIG. 6A, the first connected vehicle 602A and the third connected vehicle 602C can be travelling in a main lane M, and the second connected vehicle 602B can be travelling on a ramp R. All of the connected vehicles 602A, 602B, 602C can be travelling toward the merging point P. The connected vehicles 602A, 602B, 602C can send their locations and speeds to the server 604. The server 604, and more specifically, the map matching module 350, can determine that the second connected vehicle 602B is within the geo-fence 610 surrounding the merging point P. The server 604 can receive the locations and speeds of the connected vehicles 602A, 602B, 602C. Using the received locations and speeds, the server 604 can determine the time it would take each of the connected vehicles 602A, 602B, 602C to reach the merging point P. The server 604 can determine an order for the connected vehicles 602A, 602B, 602C to merge. The order can be based on the connected vehicle with the shortest time to reach the merging point. The server 604 can identify the connected vehicle with the shortest time as the lead connected vehicle, the connected vehicle with the second shortest time as the first following connected vehicle, and so on. In this example, the server 604 can determine the merging sequence as being: (1) connected vehicle 602A, (2) connected vehicle 602B, and (3) connected vehicle 602C.

The server 604 can determine whether to calculate an advisory speed for the lead connected vehicle. In one instance, the server 604 may not calculate an advisory speed for the lead connected vehicle and can calculate the advisory speed for the following connected vehicles based on, at least, the current speed of the lead connected vehicle. As an example, if the first connected vehicle 602A would reach the merging point P in 9 seconds, and the second and third connected vehicles 602B, 602C would reach in 10 seconds, the server 604 can identify the first connected vehicle 602A as the lead vehicle. The server 604 may not calculate an advisory speed for the first connected vehicle 602A. The server 604 can calculate an advisory speed for the second and third connected vehicles 602B, 602C based on the current speed of the lead vehicle 602A and the time to reach the merging point P for the second and third connected vehicles 602B, 602C. In another instance, the server 604 can calculate an advisory speed for the lead vehicle 602A as well as for the remaining connected vehicles 602B, 602C. In a case where the time to the merging point P is the same for two or more connected vehicles, the server 604 can select an order for the two or more connected vehicles arbitrarily or in any suitable manner.

As shown in FIG. 6B, the server 604 can determine advisory speeds for the connected vehicles 602A, 602B, 602C and can send the determined advisory speeds to the connected vehicles 602A, 602B, 602C. The server 604 can monitor the connected vehicles 602A, 602B, 602C to determine whether the connected vehicles 602A, 602B, 602C are approaching and/or maintaining the advisory speeds. In the case that one or more connected vehicles 602A, 602B, 602C are not within a predetermined threshold of its advisory speed, the server 604 can deactivate the merging assistance process. In such case, the merging can be performed manually by the drivers.

As shown in FIG. 6C, if the connected vehicles 602A, 602B, 602C maintain their advisory speeds, the connected vehicles 602A, 602B, 602C can successfully merge, with connected vehicle 602B merging into the main lane M between the connected vehicles 602A, 602C.

It will be appreciated that arrangements described herein can provide numerous benefits, including one or more of the benefits mentioned herein. For example, arrangements described herein can result in cooperative merging between connected vehicles on the main lane and on the ramp. Arrangements described herein can enable driver to control a vehicle to merge with other vehicles in a much safer and smoother manner. Arrangements described herein can result in a merging process that avoid the need for last second speed and/or position adjustments. Arrangements described herein can provide data processing in real time on server(s) with the results of the data processing (advisory speeds, alerts) being sent to the connected vehicles. Arrangements described herein can be installed and/or uninstalled from a vehicle without affecting any underlying hardware in the vehicle. Arrangements described herein can provide human drivers with important information about the external environment. Arrangements described herein can take advantage of vehicle-to-cloud (V2C) communication. Arrangements described herein can result in all of the computing processes to be conducted on a server, thereby not burdening a vehicle's computers. Further, since all computations are performed in on a remote server, the arrangements described herein can be quickly and easily migrated to any mass produced vehicle. Arrangements described herein can be very portable, where the hardware devices can be equipped on any mass-produced vehicles within a short time. Arrangements described herein can improve safety, mobility, and sustainability within a ramp merging area.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A ramp merging assistance method, the method comprising:
    determining, by a server, an order for a plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;
    determining, by the server, an advisory speed for at least one connected vehicle such that the plurality of connected vehicles achieve the order;
    determining, by the server, whether at least one of the plurality of connected vehicles is located within a geo-fence surrounding the merging point; and
    sending, by the server, the advisory speed to the at least one connected vehicle.

2. The ramp merging assistance method of claim 1, further including:
    determining, by the server, an arrival time to the merging point for the at least one connected vehicle, wherein the arrival time is the time taken for the at least one connected vehicle to reach the merging point.

3. A ramp merging assistance method, the method comprising:
- determining, by a server, an order for a plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;
- determining, by the server, an advisory speed for at least one connected vehicle such that the plurality of connected vehicles achieve the order;
- sending, by the server, the advisory speed to the at least one connected vehicle; and
- determining, by the server, an arrival time to the merging point for the at least one connected vehicle, wherein the arrival time is the time taken for the at least one connected vehicle to reach the merging point,
- wherein determining the order further includes determining the order based on the arrival time for the at least one connected vehicle.

4. A ramp merging assistance method, the method comprising:
- determining, by a server, an order for a plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;
- determining, by the server, an advisory speed for at least one connected vehicle such that the plurality of connected vehicles achieve the order; and
- sending, by the server, the advisory speed to the at least one connected vehicle,
- wherein determining the advisory speed further includes determining a raw advisory speed.

5. A ramp merging assistance method, the method comprising:
- determining, by a server, an order for a plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;
- determining, by the server, an advisory speed for at least one connected vehicle such that the plurality of connected vehicles achieve the order;
- sending, by the server, the advisory speed to the at least one connected vehicle; and
- monitoring, by the server, the at least one connected vehicle to determine whether the advisory speed has been attained.

6. The ramp merging assistance method of claim 5, further including, in response to the advisory speed not being attained:
- sending, by the server, an alert to the at least one connected vehicle.

7. A ramp merging assistance method, the method comprising:
- determining, by a server, an order for a plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;
- determining, by the server, an advisory speed for at least one connected vehicle such that the plurality of connected vehicles achieve the order;
- sending, by the server, the advisory speed to the at least one connected vehicle;
- acquiring, using one or more sensors of the at least one connected vehicle, data about the at least one connected vehicle, wherein the data includes at least a location and a speed of the at least one connected vehicle;
- sending the data from the at least one connected vehicle to the server; and
- receiving, by the at least one connected vehicle, the advisory speed from the server.

8. A ramp merging assistance system, the system comprising:
- a server communicatively linked to a plurality of connected vehicles, the server configured to:
  - determine an order for the plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;
  - determine at least one connected vehicle to be in a geo-fence surrounding the merging point;
  - determine an advisory speed for at least one connected vehicle such that the plurality of connected vehicles achieve the order; and
  - send the advisory speed to the at least one connected vehicle.

9. The ramp merging assistance system of claim 8, wherein the server is further configured to:
- determine an arrival time to the merging point for the at least one connected vehicle, wherein the arrival time is the time taken for the at least one connected vehicle to reach the merging point.

10. A ramp merging assistance system, the system comprising:
- a server communicatively linked to a plurality of connected vehicles, the server configured to:
  - determine an order for the plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;
  - determine an advisory speed for at least one connected vehicle such that the plurality of connected vehicles achieve the order; and
  - send the advisory speed to the at least one connected vehicle,
  - wherein determining the order further includes determining the order based on an arrival time for the at least one connected vehicle.

11. A ramp merging assistance system, the system comprising:
- a server communicatively linked to a plurality of connected vehicles, the server configured to:

determine an order for the plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;

determine an advisory speed for at least one connected vehicle such that the plurality of connected vehicles achieve the order; and send the advisory speed to the at least one connected vehicle, wherein determining the advisory speed further includes determining a raw advisory speed.

12. A ramp merging assistance system, the system comprising:

a server communicatively linked to a plurality of connected vehicles, the server configured to:

determine an order for the plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;

determine an advisory speed for at least one connected vehicle such that the plurality of connected vehicles achieve the order;

send the advisory speed to the at least one connected vehicle; and monitor the at least one connected vehicle to determine whether the advisory speed has been attained.

13. The ramp merging assistance system of claim 12, wherein the server is further configured to:

in response to the advisory speed not being attained, send an alert to the at least one connected vehicle.

14. A computer program product for ramp merging assistance, the computer program product comprising a computer readable storage medium having program code embodied therewith, the program code executable by a processor to perform a method comprising:

determining, by a server, an order for a plurality of connected vehicles to merge on a main lane substantially at a merging point, the merging point being where the main lane and a ramp meet, one or more of the plurality of connected vehicles being located on the ramp, and one or more of the plurality of connected vehicles being located on the main lane approaching the merging point;

determining, by the server, an advisory speed for at least one connected vehicle such that the plurality of connected vehicles achieve the order; and sending, by the server, the advisory speed to the at least one connected vehicle, wherein determining the advisory speed further includes determining a raw advisory speed.

15. The computer program product for ramp merging assistance of claim 14, wherein the method further includes:

determining, by the server, at least one connected vehicle to be in a geo-fence surrounding the merging point.

16. The computer program product for ramp merging assistance of claim 14, wherein the method further includes:

determining, by the server, an arrival time to the merging point for the at least one connected vehicle, wherein the arrival time is the time taken for the at least one connected vehicle to reach the merging point.

17. The computer program product for ramp merging assistance of claim 16, wherein determining the order further includes determining the order based on the arrival time for the at least one connected vehicle.

\* \* \* \* \*